(12) United States Patent
Tseng et al.

(10) Patent No.: US 11,054,956 B1
(45) Date of Patent: Jul. 6, 2021

(54) TOUCH DEVICES WITH ALL SCAN LINES CASCADED AND DETERMINATION METHODS THEREOF

(71) Applicant: Wistron Corp., New Taipei (TW)

(72) Inventors: Hua Min Tseng, New Taipei (TW); Chiu Yen Lin, New Taipei (TW)

(73) Assignee: WISTRON CORP., New Taipei (TW)

(*) Notice: Subject to any disclaimer, the term of this patent is extended or adjusted under 35 U.S.C. 154(b) by 0 days.

(21) Appl. No.: 16/829,361

(22) Filed: Mar. 25, 2020

(30) Foreign Application Priority Data

Dec. 25, 2019 (TW) .................................. 108147501

(51) Int. Cl.
*G06F 3/044* (2006.01)
*G06F 3/041* (2006.01)

(52) U.S. Cl.
CPC ........ *G06F 3/0446* (2019.05); *G06F 3/04166* (2019.05)

(58) Field of Classification Search
CPC combination set(s) only.
See application file for complete search history.

(56) References Cited

U.S. PATENT DOCUMENTS

| | | | | |
|---|---|---|---|---|
| 2006/0164564 A1* | 7/2006 | Choi | .................... | G09G 3/3648 349/33 |
| 2012/0013593 A1* | 1/2012 | Yamamoto | .............. | G06F 3/045 345/211 |
| 2012/0229408 A1* | 9/2012 | Yamamoto | ......... | G06F 3/04166 345/173 |
| 2016/0049126 A1* | 2/2016 | Zhang | .................. | G09G 3/3696 345/173 |
| 2017/0123562 A1* | 5/2017 | Cletheroe | ........... | G06F 3/03547 |
| 2017/0235406 A1* | 8/2017 | Su | .......................... | G06F 3/0412 345/173 |
| 2018/0102102 A1* | 4/2018 | Su | ............................ | G09G 3/36 |
| 2019/0043437 A1* | 2/2019 | Hao | ...................... | G09G 3/3677 |
| 2020/0075112 A1* | 3/2020 | Fei | .......................... | G11C 19/28 |

FOREIGN PATENT DOCUMENTS

| | | | |
|---|---|---|---|
| CN | 1811534 | A | 8/2006 |
| CN | 105867691 | A | 8/2016 |
| CN | 105867691 | B | * 12/2018 |

OTHER PUBLICATIONS

Chinese language office action dated Jul. 3, 2020, issued in application No. TW 108147501.

* cited by examiner

*Primary Examiner* — Amy Onyekaba
(74) *Attorney, Agent, or Firm* — McClure, Qualey & Rodack, LLP

(57) ABSTRACT

A touch device includes a touch panel, a driving circuit, a sensing circuit, and a controller. The touch panel includes a first scan line cascaded with a first diode, a second scan line cascaded with a second diode, and a sense line interlaced with the first scan line and a second scan line. The first scan line and the second scan line are cascaded between a first node and a second node. The driving circuit generates a scan voltage across the first node and the second node according to a scan signal. The sensing circuit detects a capacitance of the sense line according to a detection signal to generate a receive signal. The controller generates the scan signal and the sense signal and determines the location of a touch point on the touch panel according to the scan voltage and the receive signal.

12 Claims, 3 Drawing Sheets

TOUCH DEVICES WITH ALL SCAN LINES CASCADED AND DETERMINATION METHODS THEREOF

CROSS REFERENCE TO RELATED APPLICATIONS

This application claims priority of Taiwan Patent Application No. 108147501, filed on Dec. 25, 2019, the entirety of which is incorporated by reference herein.

BACKGROUND OF THE INVENTION

Field of the Invention

The disclosure relates generally to touch devices and determination methods thereof, and more particularly it relates to touch devices with all scan lines cascaded and determination methods thereof.

Description of the Related Art

In recent years, it is expected that display devices will be applied in various applications, and these display devices are utilized in diverse ways, such as being utilized as a portable information terminal. Therefore, the development of smartphones and tablet terminals with touch panels is accelerating.

In the design of a driving circuit in a touch panel, a plurality of driving lines, such as scan lines and sense lines, are often used to achieve the goal of multi-finger touching. The larger the touch panel, the more driving lines it needs. As a result, the area of the driving circuit in a touch panel must increase accordingly. In order to reduce the production cost, it is required to optimize the driving lines.

BRIEF SUMMARY OF THE INVENTION

In an embodiment, a touch device comprises a touch panel, a driving circuit, a sense circuit, and a controller. The touch panel comprises a first scan line, a second scan line, and a sense line. The first scan line is cascaded with a first diode. The second scan line is cascaded with a second diode. The first scan line and the second scan line are cascaded between a first node and a second node. The sense line is interlaced with the first scan line and the second scan line. The driving circuit generates a first scan voltage across the first node and the second node according to a scan signal. The sense circuit detects a capacitance of the sense line according to a detection signal to generate a receive signal. The controller generates the scan signal and the detection signal and determines the location of a touch point on the touch panel according to the first scan voltage and the receive signal.

In an embodiment, a determination method adapted to a touch panel is provided. The touch panel comprises a first scan line cascaded with a first diode, a second scan line cascaded with a second diode, and at least one sense line. The first scan line and the second scan line are cascaded between a first node and a second node, and the sense line is interlaced with the first scan line and the second scan line. The determination method comprises generating a first scan voltage across the first node and the second node; detecting a capacitance of the sense line; and determining the location of a touch point of a touch event according to the first scan voltage and the capacitance of the sense line.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
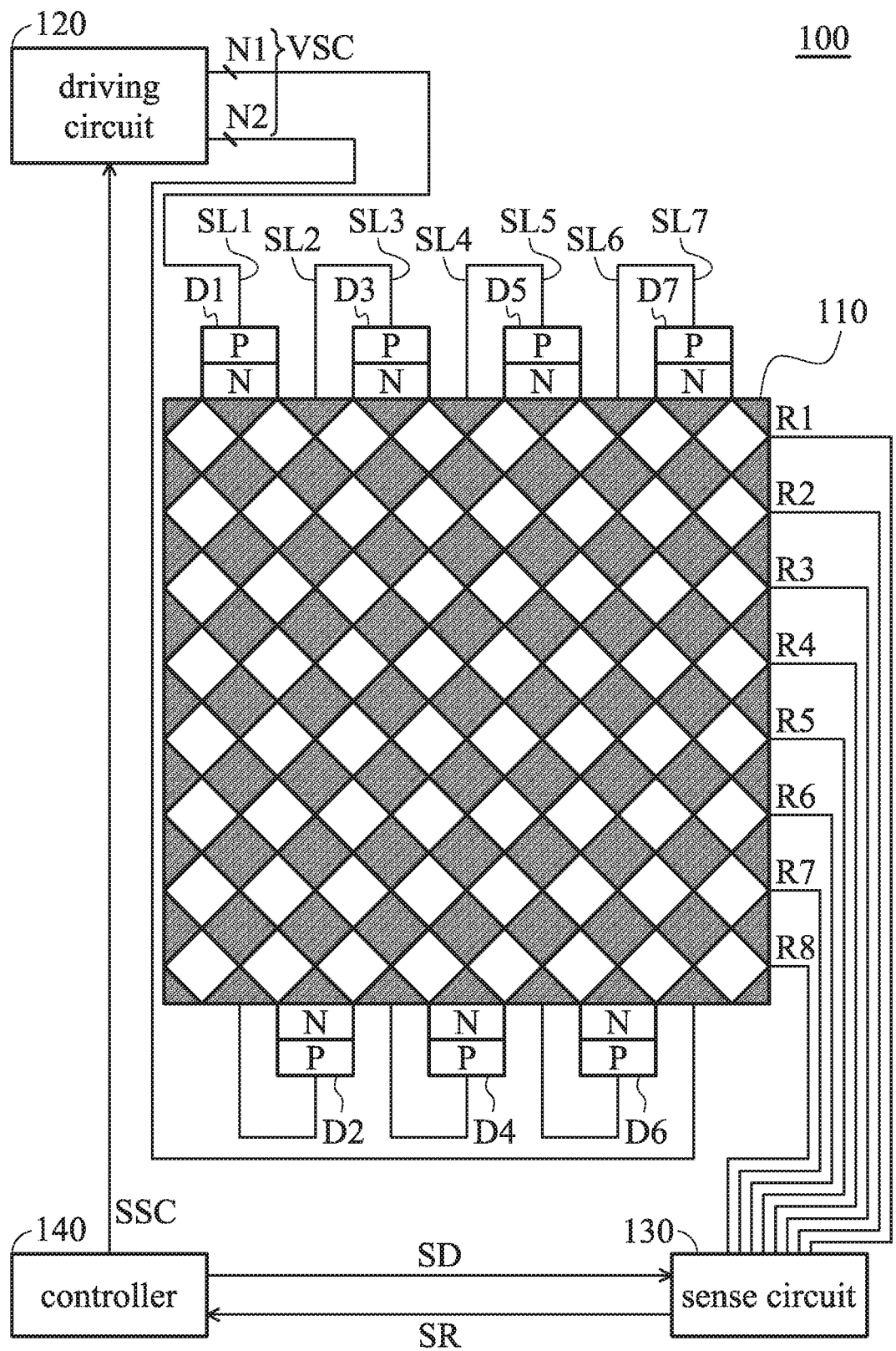
FIG. 1 is a block diagram in accordance with an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a block diagram in accordance with an embodiment of the invention. As shown in FIG. 1, the touch device 100 includes a touch panel 110, a driving circuit 120, a sense circuit 130, and a controller 140. The touch panel 110 includes a first scan line SL1, a second scan line SL2, a third scan line SL3, a fourth scan line SL4, a fifth scan line SL5, a sixth scan line SL6, and a seventh scan line SL7.

The first scan line SL1, the second scan line SL2, the third scan line SL3, the fourth scan line SL4, the fifth scan line SL5, the sixth scan line SL6, and the seventh scan line SL7 are respectively cascaded with a first diode D1, a second diode D2, a third diode D3, a fourth diode D4, a fifth diode D5, a sixth diode D6, and a seventh diode D7, and all the scan lines and all the diodes are cascaded between a first node N1 and a second node N2.

As shown in FIG. 1, the touch panel 110 further includes a first sense line R1, a second sense line R2, a third sense line R3, a fourth sense line R4, a fifth sense line R5, a sixth sense line R6, a seventh sense line R7, and an eighth sense line R8, in which all the sense lines are interlaced with all the scan lines. According to other embodiments of the invention, the number of the scan lines and that of the sense lines are illustrated herein, but not to be limited thereto.

The controller 140 generates a scan signal SSC to control a scan voltage VSC generated by the driving circuit 120, generates a detection signal SD to control the capacitance of each sense line detected by the sense circuit 130, and determines the location of the touch point on the touch panel 110 according to the scan voltage VSC generated by the driving circuit 120 and a receive signal SR.

According to an embodiment of the invention, when the scan voltage VSC generated by the driving circuit 120 exceeds the forward voltage of the first diode D1 and is also less than the sum of the forward voltages of the first diode D1 and the second diode D2, the scan voltage VSC only charges the first scan line SL1, in which the voltage of the first node N1 exceeds that of the second node N2. When the first scan line SL1 is charged, the controller 140 controls, by the detection signal SD, the sense circuit 130 to detect the capacitance of each of the first sense line R1, the second sense line R2, the third sense line R3, the fourth sense line R4, the fifth sense line R5, the sixth sense line R6, the seventh sense line R7, and the eighth sense line R8. The controller 140 further determines whether the capacitance of any one of the sense lines exceeds a first threshold according to the receive signal SR. For example, when the capacitance of the second sense line R2 exceeds the first threshold, it indicates that a touch point has occurred at the intersection of the first scan line SL1 and the second scan line R2.

According to another embodiment of the invention, when the scan voltage VSC generated by the driving circuit 120 exceeds the sum of the forward voltages of the first diode D1 and the second diode D2 and is less than the sum of the forward voltages of the sum of the first diode D1, the second diode D2, and the third diode D3, the scan voltage VSC simultaneously charges the first scan line SL1 and the second scan line SL2, in which the voltage of the first node N1 exceeds that of the second node N2. When the first scan line SL1 and the second scan line SL2 are charged, the controller 140 controls, by the detection signal SD, the sense circuit 130 to detect the capacitance of each of the first sense line R1, the second sense R2, the third sense line R3, the fourth sense line R4, the fifth sense line R5, the sixth sense line R6, the seventh sense line R7, and the eighth sense line R8. The controller 140 further determines whether the capacitance of any one of the sense lines exceeds a second threshold according to the receive signal SR.

According to an embodiment of the invention, since each of the sense lines detects the capacitance of two scan lines, the second threshold exceeds the first threshold. For example, when only the first scan line SL1 is charged and there is no touch point occurred on the first scan line SL1, the capacitance detected by each of the sense lines is A. When the first scan line SL1 and the second scan line SL2 are charged and there is no touch point occurred on the first scan line SL1 and the second scan line SL2, the capacitance detected by each of the sense lines is 2A. Therefore, the second threshold exceeds the first threshold.

For example, when the controller 140 determines that the capacitance of the second sense line R2 exceeds the second threshold, it indicates that the touch point may be occurred at the intersection of the first scan line SL1 and the second sense line R2 or the intersection of the second scan line SL2 and the second sense line R2. According to an embodiment of the invention, if the controller has determined that there is no touch event occurred on the first scan line SL1 when only the first scan line SL1 is charged, the controller 140 can determine that the touch point has occurred at the intersection of the second scan line SL2 and the second sense line R2.

According to other embodiment of the invention, when the scan voltage VSC exceeds the sum of the forward voltages of the first diode D1, the second diode D2, the third diode D3, the fourth diode D4, the fifth diode D5, the sixth diode D6, and the seventh diode D7, the scan voltage VSC charges the first sense line R1, the second sense line R2, the third sense line R3, the fourth sense line R4, the fifth sense line R5, the sixth sense line R6, the seventh sense line R7, and the eighth sense line R8 simultaneously.

In other words, the controller 140 may sequentially charges the first scan line SL1, the second scan line SL2, the third scan line SL3, the fourth scan line SL4, the fifth scan line SL5, the sixth scan line SL6, and the seventh scan line SL7 by controlling the value of the scan voltage VSC so as to determine the location of the touch point occurred on the touch panel 110.

Figure 2:
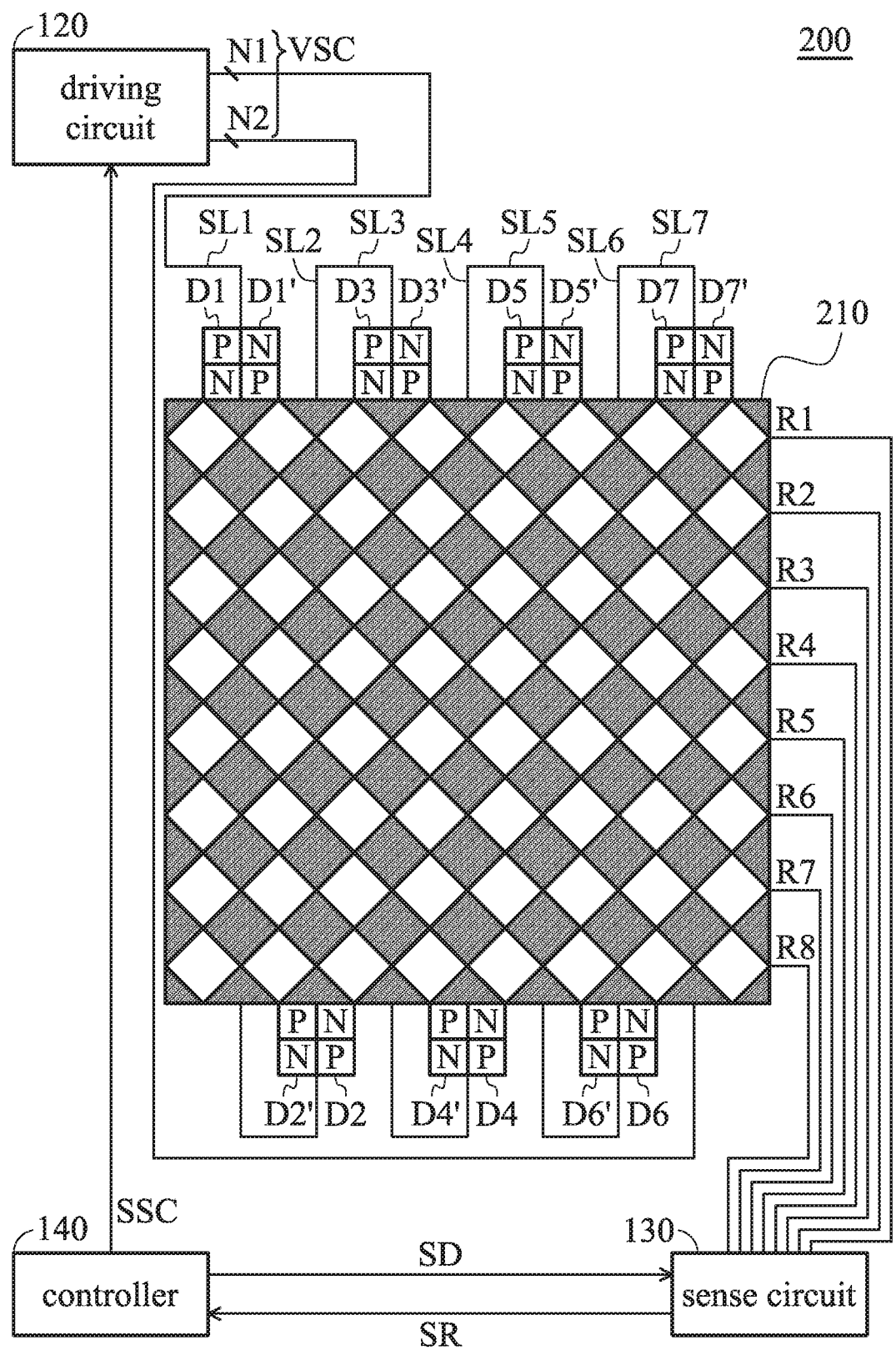
FIG. 2 is a block diagram in accordance with another embodiment of the invention.

FIG. 2 is a block diagram in accordance with another embodiment of the invention. Compared the touch device 200 with the touch device 100 in FIG. 1, the first scan line SL1, the second scan line SL2, the third scan line SL3, the fourth scan line SL4, the fifth scan line SL5, the sixth scan line SL6, and the seventh scan line SL7 of the touch panel 210 are respectively cascaded with a first reverse diode D1', a second reverse diode D2', a third reverse diode D3', a fourth reverse diode D4', a fifth reverse diode D5', a sixth reverse diode D6', and a seventh reverse diode D7', in which the conduction direction of the first reverse diode D1', the second reverse diode D2', the third reverse diode D3', the fourth reverse diode D4', the fifth reverse diode D5', the sixth reverse diode D6', and the seventh reverse diode D7' is opposite to that of the first diode D1, the second diode D2, the third diode D3, the fourth diode D4, the fifth diode D5, the sixth diode D6, and the seventh diode D7.

According to an embodiment of the invention, the controller 140 may control the driving circuit 120 to generate the scan voltage VSC, which is a negative voltage. Namely, the voltage of the second node N2 exceeds that of the first node N1. Therefore, the driving circuit 120 may sequentially charge the seventh scan line SL7, the sixth scan line SL6, the fifth scan line SL5, the fourth scan line SL4, the third scan line SL3, the second scan line SL2, and the first scan line SL1.

For example, when the controller 140 generates the scan voltage VSC so that the voltage of the first node N1 exceeds that of the second node N2, the scan voltage VSC charges the first scan line SL1 to the sixth scan line SL6, and the controller 140 determines that there is at least one touch point occurred on the seventh scan line SL7. The controller 140 may further generate the scan voltage VSC so that the voltage of the first node N1 is less than that of the second node N2, and charge the seventh scan line SL7 so as to confirm whether there is a touch point occurred on the seventh scan line SL7.

According to other embodiments of the invention, the controller 140 determines to generate a positive voltage of the scan voltage VSC or a negative voltage of the scan voltage VSC according to the location of the scan line, in order to reduce the time for charging the scan lines.

According to an embodiment of the invention, the first diode D1, the second diode D2, the third diode D3, the fourth diode D4, the fifth diode D5, the sixth diode D6, the seventh diode D7, the first reverse diode D1', the second reverse diode D2', the third reverse diode D3', the fourth reverse diode D4', the fifth reverse diode D5', the sixth reverse diode D6', and the seventh reverse diode D7' may be implemented on the substrate of a color filter. According to another embodiment of the invention, the first diode D1, the second diode D2, the third diode D3, the fourth diode D4, the fifth diode D5, the sixth diode D6, the seventh diode D7, the first reverse diode D1', the second reverse diode D2', the third reverse diode D3', the fourth reverse diode D4', the fifth reverse diode D5', the sixth reverse diode D6', and the seventh reverse diode D7' may be implemented on the substrate of TFT (Thin-Film Transistor).

Figure 3:
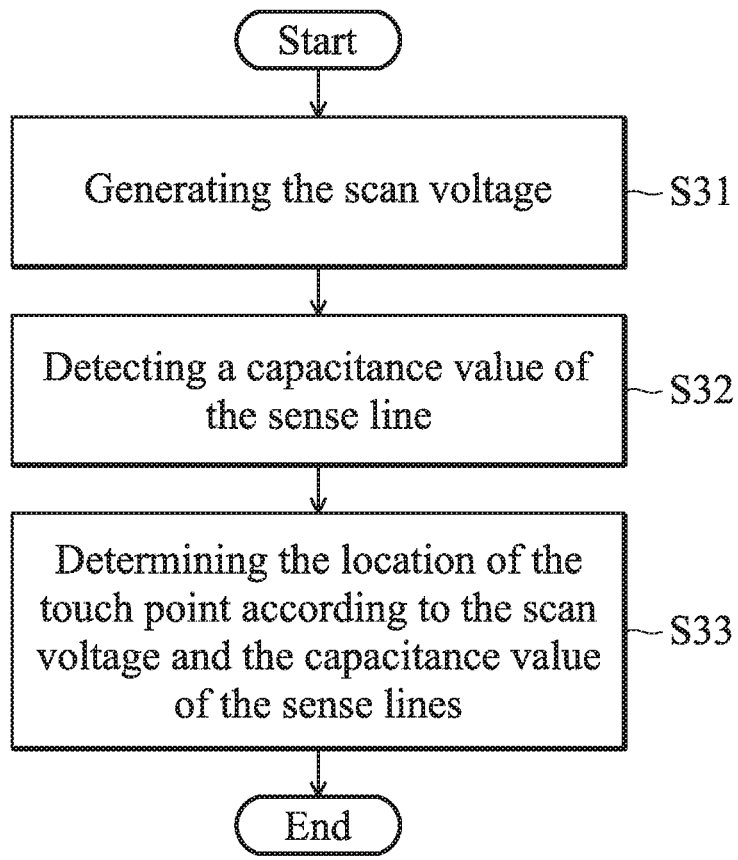
FIG. 3 is a flow chart in accordance with an embodiment of the invention.

FIG. 3 is a flow chart in accordance with an embodiment of the invention. The flow chart of the determination method 300 will be described with the block diagrams in FIG. 1 and FIG. 2.

Firstly, the driving circuit 120 is controlled to generate the scan voltage VSC between the first node N1 and the second node N2 (Step S31). As shown in FIG. 1, the scan voltage generated by the driving circuit 120 leads that the voltage of the first node N1 exceeds that of the second node N2, and that the first scan line SL1, the second scan line SL2, the third scan line SL3, the fourth scan line SL4, the fifth scan line SL5, the sixth scan line SL6, and the seventh scan line SL7 are sequentially charged according to the relationship of the value of the scan voltage VSC to the forward voltages of the first diode D1 to the seventh diode D7.

As shown in FIG. 2, the scan voltage VSC generated by the driving circuit 120 leads that the voltage of the first node N1 exceeds that of the second node N2, and that the first scan line SL1, the second scan line SL2, the third scan line SL3, the fourth scan line SL4, the fifth scan line SL5, the sixth scan line SL6, and the seventh scan line SL7 are sequentially charged according to the relationship of the value of the scan voltage VSC to the forward voltages of the first diode D1 to the seventh diode D7. In addition, the driving circuit 120 in FIG. 2 generates the scan voltage VSC so that the voltage of the first node N1 is less than that of the second node N2. The seventh scan line SL7, the sixth scan line SL6, the fifth scan line SL5, the fourth scan line SL4, the third scan line SL3, the second scan line SL2, and the first scan line SL1 are sequentially charged according to the relationship of the value of the scan voltage VSC to the forward voltages of the first reverse diode D1' to the seventh reverse diode D7'.

Referring to the determination method 300, the sense circuit 130 is controlled to detect the capacitance of the first sense line R1, the second sense line R2, the third sense line R3, the fourth sense line R4, the fifth sense line R5, the sixth sense line R6, the seventh sense line R7, and the eighth sense line R8 (Step S32). Then, the location of the touch point of a touch event is determined according to the scan voltage VSC and the capacitance of the sense lines (Step S33). According to an embodiment of the invention, since the driving voltage VSC can simultaneously charge one or more scan lines, the controller 140 can determine which scan line has been charged according to the value of the scan voltage VSC and determine the location of the touch point according to whether the capacitance of the scan lines exceed the threshold.

For example, as shown in FIG. 1, when the scan voltage VSC exceeds the forward voltage of the first diode D1, the scan voltage VSC only charges the first scan line SL1 and the sense circuit 130 detects the capacitance of all the sense lines. When the controller 140 determines that the capacitance of one of the sense lines exceeds the first threshold, a touch point is determined to be at the intersection of the sense line and the first scan line SL1.

For example, as shown in FIG. 2, when the scan voltage VSC exceeds the sum of the forward voltages of the first diode D1 and the second diode D2, the scan voltage VSC charges the first scan line SL1 and the second scan line SL2, and the sense circuit 130 senses the capacitance of all the sense lines. When the controller 140 determines that the capacitance of one of the sense lines exceeds the second threshold, a touch point is determined to be occurred at the intersection of the sense line and the first scan line SL1 or at the intersection of the sense line and the second scan line SL2.

In order to confirm that the touch point has occurred on the first scan line SL1 or the second scan line SL2, according to an embodiment of the invention, the controller 140 may control the driving circuit 120 to only charge the first scan line SL1 and determine whether the capacitance of all the sense lines exceed the first threshold. According to another embodiment of the invention, the controller 140 may generate a negative voltage of the scan voltage VSC to charge the seventh scan line SL7 to the second scan line SL2, and determine whether the capacitance of the sense lines exceed the threshold to confirm whether there is a touch point occurred on the second scan line SL2. The voltage of the second node N2 exceeds that of the first node N1.

The touch devices and the determination methods thereof are provided herein. Since the scan lines each is cascaded with a diode and all the scan lines and all the diodes are cascaded with one another, the number of driving lines in a touch panel can be greatly reduced so as to reduce production cost. The location of the touch point can be rapidly and correctly determined by the determination method.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A touch device, comprising:
   a touch panel, comprising:
   a first scan line, cascaded with a first diode;

a second scan line, cascaded with a second diode, wherein the first scan line and the second scan line are cascaded between a first node and a second node; and a sense line, interlaced with the first scan line and the second scan line;

a driving circuit, generating a first scan voltage across the first node and the second node according to a scan signal;

a sense circuit, detecting a capacitance of the sense line according to a detection signal to generate a receive signal; and a controller, generating the scan signal and the detection signal and determining a location of a touch point on the touch panel according to the first scan voltage and the receive signal.

2. The touch device of claim 1, wherein the first diode has a first forward voltage, and the second diode has a second forward voltage, wherein when the first scan voltage exceeds the first forward voltage and is less than a sum of the first forward voltage and the second forward voltage and a voltage of the first node exceeds a voltage of the second node, the driving circuit charges the first scan line, wherein when the controller determines that the capacitance of the sense line exceeds a first threshold, the controller determines that the touch point has occurred at an intersection of the first scan line and the sense line.

3. The touch device of claim 2, wherein when the first scan voltage exceeds the sum of the first forward voltage and the second forward voltage and the voltage of the first node exceeds the voltage of the second node, the driving circuit charges the first scan line and the second scan line, wherein when the controller determines that the capacitance of the sense line exceeds a second threshold, the controller determines that the touch points have occurred on an intersection of the first scan line and the sense line and an intersection of the second scan line and the sense line.

4. The touch device of claim 3, wherein a third diode in parallel with the first diode is cascaded with the first scan line, and a conduction direction of the first diode is opposite to a conduction direction of the third diode, wherein a fourth diode in parallel with the second diode is cascaded to the second scan line, and a conduction direction of the second diode is opposite to a conduction direction of the fourth diode, wherein the third diode has a third forward voltage, and the fourth diode has a fourth forward voltage.

5. The touch device of claim 4, wherein when the controller determines that the touch points have occurred at the intersection of the first scan line and the sense line and the intersection of the second scan line and the sense line, the driving circuit generates a second scan voltage to charge the second scan line according to the scan signal, wherein the second scan voltage exceeds the fourth forward voltage and is less than a sum of the third forward voltage and the fourth forward voltage and the voltage of the first node is less than the voltage of the second node, wherein when the controller determines the capacitance of the sense line exceeds the first threshold, the controller confirms that the touch point has occurred at the intersection of the second scan line and the sense line.

6. The touch device of claim 4, wherein the first diode, the second diode, the third diode, and the fourth diode are implemented on a substrate of TFT or on a substrate of a color filter.

7. The touch device of claim 1, wherein the first scan line, the first diode, the second scan line and the second diode are serially connected between the first node and the second node.

8. A determination method adapted to a touch panel, wherein the touch panel comprises a first scan line cascaded with a first diode, a second scan line cascaded with a second diode, and at least one sense line, wherein the first scan line and the second scan line are cascaded between a first node and a second node, and the sense line is interlaced with the first scan line and the second scan line, wherein the determination method comprises:

generating a first scan voltage across the first node and the second node;

detecting a capacitance of the sense line; and determining a location of a touch point of a touch event according to the first scan voltage and the capacitance of the sense line.

9. The determination method of claim 8, wherein the first diode has a first forward voltage, and the second diode has a second forward voltage, wherein the determination method further comprises:

when the first scan voltage exceeds the first forward voltage and is less than a sum of the first forward voltage and the second forward voltage and a voltage of the first node exceeds a voltage of the second node, charging the first scan line;

determining whether the capacitance of the sense line exceeds a first threshold;

when it is determined that the capacitance of the sense line exceeds the first threshold, determining that the touch point has occurred at an intersection of the first scan line and the sense line; and when it is determined that the capacitance of the sense line does not exceed the first threshold, determining that the touch event has not occurred on the first scan line.

10. The determination method of claim 9, wherein the determination method further comprises:

when the first scan voltage exceeds the sum of the first forward voltage and the second forward voltage and the voltage of the first node exceeds the voltage of the second node, simultaneously charging the first scan line and the second scan line;

determining whether the capacitance of the sense line exceeds a second threshold;

when it is determined that the capacitance of the sense line exceeds the second threshold, determining that the touch points have occurred at the intersection of the first scan line and the sense line and the intersection of the second scan line and the sense line;

when it is determined that the capacitance of the sense line does not exceed the second threshold, determining that the touch event has not occurred on the first scan line or the second scan line.

11. The determination method of claim 10, wherein a third diode in parallel with the first diode is cascaded with the first scan line, and a conduction direction of the first diode is opposite to a conduction direction of the third diode, wherein a fourth diode in parallel with the second diode is cascaded with the second scan line, and a conduction direction of the second diode is opposite to a conduction direction of the fourth diode, wherein the third diode has a third forward voltage, and the fourth diode has a fourth forward voltage, wherein the step of determining that the touch points have occurred at the intersection of the first scan line and the sense line and the intersection of the second scan line and the sense line comprises:

generating a second scan voltage between the first node and the second node to charge the second scan line, wherein the second scan voltage exceeds the fourth forward voltage and is less than a sum of the third forward voltage and the fourth forward voltage, wherein the voltage of the first node is less than the voltage of the second node;

determining whether the capacitance of the sense line exceeds a first threshold; and when it is determined that the capacitance of the sense line exceeds the first threshold, determining that the touch point has occurred at the intersection of the second scan line and the sense line.

12. The determination method of claim 8, wherein the first scan line, the first diode, the second scan line and the second diode are serially connected between the first node and the second node.

\* \* \* \* \*